(12) United States Patent
Snapiri et al.

(10) Patent No.: US 11,399,034 B2
(45) Date of Patent: Jul. 26, 2022

(54) SYSTEM AND METHOD FOR DETECTING AND PREVENTING NETWORK INTRUSION OF MALICIOUS DATA FLOWS

(71) Applicant: Huawei Cloud Computing Technologies Co., Ltd., Gui'an New District (CN)

(72) Inventors: Shachar Snapiri, Munich (DE); Eshed Gal-Or, Munich (DE); Eran Gampel, Munich (DE); Ayal Baron, Munich (DE)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 465 days.

(21) Appl. No.: 15/870,004

(22) Filed: Jan. 12, 2018

(65) Prior Publication Data

US 2018/0139217 A1    May 17, 2018

Related U.S. Application Data

(63) Continuation of application No. PCT/EP2016/064422, filed on Jun. 22, 2016.

(51) Int. Cl.
*H04L 9/40* (2022.01)
*H04L 47/2441* (2022.01)
(Continued)

(52) U.S. Cl.
CPC .......... *H04L 63/1416* (2013.01); *G06F 16/27* (2019.01); *G06F 21/554* (2013.01);
(Continued)

(58) Field of Classification Search
CPC ............. H04L 63/1416; H04L 47/2441; H04L 63/0245; H04L 63/0254; H04L 63/1425; G06F 16/27; G06F 21/554
See application file for complete search history.

(56) References Cited

U.S. PATENT DOCUMENTS 8,789,135 B1    7/2014 Pani
9,258,225 B2    2/2016 Hill et al.
(Continued)

FOREIGN PATENT DOCUMENTS

CN    105429974 A    3/2016
CN    105474602 A    4/2016
(Continued)

OTHER PUBLICATIONS

CN/201680071811.8, Office Action/Search Report, dated Jul. 3, 2020.

*Primary Examiner* — Linglan E Edwards
*Assistant Examiner* — Forrest L Carey
(74) *Attorney, Agent, or Firm* — Leydig, Voit & Mayer, Ltd.

(57) ABSTRACT

The present disclosure provides a system for detecting and preventing the intrusion of malicious data flows in a software defined network (SDN). The system comprises at least one data storage or memory, configured to store flow states of data flows, and to share and update the flow states across the system, at least one shared-state forwarding element (FE) configured to block, forward, or replicate a received data flow based on a flow state of the data flow and/or a comparison of the data flow with predetermined patterns, and at least one inspection element (IE), configured to receive a replicated data flow, and to classify, whether the data flow is malicious or allowed. The IE is configured to alter the flow state of the data flow according to a classification result. The present disclosure provides a corresponding method for detecting and preventing intrusion of malicious data flows in a SDN.

13 Claims, 7 Drawing Sheets

(51) Int. Cl.
*G06F 16/27* (2019.01)
*G06F 21/55* (2013.01)

(52) U.S. Cl.
CPC ...... *H04L 47/2441* (2013.01); *H04L 63/0245* (2013.01); *H04L 63/0254* (2013.01); *H04L 63/1425* (2013.01)

(56) References Cited

U.S. PATENT DOCUMENTS

| | | | |
|---|---|---|---|
| 10,296,744 B1 * | 5/2019 | McGrew | ............... G06F 21/554 |
| 2004/0093513 A1 | 5/2004 | Cantrell et al. | |
| 2005/0044422 A1 | 2/2005 | Cantrell et al. | |
| 2006/0198313 A1 | 9/2006 | Kitamura et al. | |
| 2007/0160073 A1 * | 7/2007 | Toumura | ............... H04L 43/022 370/419 |
| 2014/0075498 A1 | 3/2014 | Porras et al. | |
| 2014/0075557 A1 | 3/2014 | Balabine et al. | |
| 2014/0317684 A1 | 10/2014 | Porras et al. | |
| 2015/0052576 A1 | 2/2015 | Togawa | |
| 2015/0334090 A1 * | 11/2015 | Ling | ................... H04L 63/0254 726/13 |
| 2016/0036838 A1 * | 2/2016 | Jain | ....................... H04L 47/726 726/23 |
| 2017/0006082 A1 * | 1/2017 | Shishodia | ........... H04L 63/1441 |
| 2017/0048312 A1 * | 2/2017 | Moyer | ............... H04L 67/1095 |
| 2017/0078313 A1 | 3/2017 | Zhong et al. | |
| 2018/0115471 A1 * | 4/2018 | Curcio | ................... H04L 47/31 |

FOREIGN PATENT DOCUMENTS

| | | |
|---|---|---|
| JP | 2006279930 A | 10/2006 |
| JP | 2009500936 A | 1/2009 |
| JP | 2010268483 A | 11/2010 |
| JP | 2015050717 A | 3/2015 |
| JP | 2015121968 A | 7/2015 |
| JP | 2016005138 A | 1/2016 |
| WO | 2013150925 A1 | 10/2013 |
| WO | 2015192319 A1 | 12/2015 |
| WO | WO 2016000160 A1 | 1/2016 |
| WO | WO 2017036535 A1 | 3/2017 |
| WO | WO 2017097352 A1 | 6/2017 |

* cited by examiner

| time | element | flow | state | action |
|---|---|---|---|---|
| t0 | 102 | F1 (C1,S1) | NEW | Allow |
| t0 | 101 | F1 (C1,S1) | NEW | Allow |
| t1 | 104 | F1 (C1,S1) | SUSPECT | Replicate, Allow |
| t1 | 101 | F1 (C1,S1) | SUSPECT | Replicate, Allow |
| t2 | 102 | F1 (C1,S1) | SUSPECT | Replicate, Allow |
| t3 | 102 | F1R (R,I,F1) | NEW | Replicate |
| t3 | 104 | F1R (R,I,F1) | NEW | Classify |
| t4 | 103 | F1R (R,I,F1) | INTERIM | Classify |
| t5 | 104 | F1 (C1,S1) | MALICIOUS | Block |
| t5 | 104 | F1R (R,I,F1) | END | Remove |
| t6 | 101 | F1 (C1,S1) | MALICIOUS | Block |
| t6 | 101 | F1R (R,I,F1) | END | Remove |
| t7 | 102 | F1 (C1,S1) | MALICIOUS | Block |
| t7 | 102 | F1R (R,I,F1) | END | Remove |

SYSTEM AND METHOD FOR DETECTING AND PREVENTING NETWORK INTRUSION OF MALICIOUS DATA FLOWS

CROSS-REFERENCE TO RELATED APPLICATIONS

This application is a continuation of International Application No. PCT/EP2016/064422, filed on Jun. 22, 2016, the disclosure of which is hereby incorporated by reference in its entirety.

TECHNICAL FIELD

The present disclosure relates to a system and a method for detecting and preventing the intrusion of malicious data flows into a protected zone or protected service of a network, particularly of a software defined network (SDN).

BACKGROUND

One of the main building blocks of organization security is an Intrusion Detection System (IDS) and an Intrusion Prevention System (IPS). These two systems have much in common, for instance, both use patterns to detect malicious attempts to attack a private network (protected zone), as well as to detect "low & slow" advanced persistent threats (APTs). As can be seen in FIG. 7, an IDS is usually deployed out-of-line, working on a replicated data stream. The IDS analyses all packets, and then reports to a so-called "expert system" (e.g. Security Information and Event Management (SIEM)), from which active measures can accordingly be triggered. An IPS can be deployed like a firewall, and typically works directly on the network data path. The IPS analyses the packets, classifies the flows, and either blocks or allows them. The IPS can also be deployed like the IDS, can consume a replicated data path, and can then use an integration with the firewall, in order to block flows that are classified as "malicious".

To cope with the amounts of data that it has to examine, the IPS typically adds a "fast path" mechanism (usually implemented by a hardware-based forwarding element), to which it can offload flows that have already been classified (either as "ALLOW" or as "BLOCK"). Regardless of whether a "fast path" is used or not, when the IPS is deployed as Online, it creates a Single Point of Failure (SPOF) in the organizational network, which requires an expensive High Availability solution to be installed, in order to guarantee service continuity when the IPS is, for example, malfunctioning. As the bandwidth of a single IPS device is limited, it is usually configured to fail-open (i.e. allow all in) when it is overwhelmed by data traffic. The Offline deployment of an IPS mitigates some of these problems of an Online IPS, however, at the cost of processing replicated network traffic (similarly to a typical IDS), and of tight integration to the "enforcing" network elements (e.g. the firewall), so that it can block malicious attacks on the main data path. Furthermore, an Offline IPS reacts much slower to network attacks.

In summary, on the one hand side Offline IDS and IPS have several limitations. Detection and reaction times are slow. Further, the systems tend to be noisy, i.e. they generate a huge amounts of data that security experts need to go through. The systems are generally rather resource-heavy. Finally, custom integration is required, in order to provide active protection.

Inline IPS on the other hand side has its own limitations. Firstly, it is very hard to scale. Further, it requires a specialized hardware to handle the "fast path" of classified traffic. As mentioned above, it represents a SPOF requiring an expensive High Availability model. Moreover, its limited bandwidth leads to the above-mentioned "fail open" on traffic spikes (i.e. allow all in). Finally, the typically used silo data model of the IPS limits the sharing of information with other IT assets, and thus hinders the ability to detect APTs.

SUMMARY

In view of the above-mentioned problems and disadvantages, the present disclosure aims to improve conventional IDS and IPS. From a security point of view, the object of the present disclosure is to provide a system and method, which is able to block malicious traffic instantaneously across the whole network. Further, better capabilities of detecting and mitigating APTs should be achieved. The present disclosure also aims at removing a SPOF from the network. From an efficiency point of view, it is an object of the present disclosure to provide a system and method, for which intrusion detection is removed from a data path, without compromising the ability to detect, inspect and block malicious traffic. A general aim is to reduce the load on intrusion detection and prevention, for instance, by only monitoring suspect traffic. In addition, no cross-vendor integration should be required, and overall costs should be reduced.

The above objects of the present disclosure are achieved by the solutions provided in the enclosed independent claims. Advantageous implementations of the present disclosure are further defined in the dependent claims.

A first aspect of the present disclosure provides a system for detecting and preventing the intrusion of malicious data flows in a SDN, comprising at least one data storage or memory, configured to store flow states of data flows, and to share and update the flow states across the system, at least one shared-state forwarding element (FE) configured to block, forward, or replicate a received data flow based on a flow state of the data flow and/or a comparison of the data flow with predetermined patterns, at least one inspection element (IE) configured to receive a replicated data flow, and to classify, whether the data flow is malicious or allowed, wherein the IE is configured to alter the flow state of the data flow according to a classification result.

The present disclosure according to the first aspect implements a mechanism to share flow sates of data flows, and preferably additional metadata, across the system, i.e. particularly between individual FEs, IEs and, optionally, service applications. Thereby, the system is able to react immediately, i.e. at least much faster than conventional systems, on suspected or detected threats. For instance, the at least one FE can immediately block a suspected data flow, when the FE classifies it as malicious, and updates its flow state accordingly. The sharing of the flow states can advantageously be implemented via Distributed Connection Tracking (DCT), which is a specific SDN implementation of sharing information like network states and flow states across the system.

By sending only replications of suspected data flows to the at least one IE, the intrusion detection is removed from the regular data path, without compromising its ability to detect, inspect and block malicious traffic. The load on the intrusion detection and prevention is significantly reduced by only sending suspected data flows to the IE, and by furthermore using predetermined patterns and shared flow states at the FE.

In a first implementation form of the system according to the first aspect, the FE is configured to forward packets of a received data flow, if a flow state of the data flow is "ALLOW" and/or if the data flow matches a predetermined pattern of allowed traffic, block packets of a received data flow, if a flow state of the data flow is "BLOCK" and/or if the data flow matches a predetermined pattern of malicious traffic, and replicate packets of a received data flow, if a flow state of the data flow is "SUSPECT" and/or if the data flow matches a predetermined pattern of suspected traffic.

The at least one FE is accordingly able to process data flows based on a shared flow state on the one hand side, and based on predetermined patterns on the other hand side. Accordingly, the overall efficiency of the system is enhanced, and at the same time the load on the IE is reduced. The system is able to react fast to any changes or updates of flow states. The system is moreover well scalable.

In a second implementation form of the system according to the first aspect as such or according to the first implementation form of the first aspect, the FE is configured to determine, whether a received data flow already has a flow state stored in the at least one data storage or memory, and to block, forward, or replicate the data flow based on the flow state of the data flow, if the received data flow has a stored flow state, or a comparison of the data flow with the predetermined patterns, if the received data flow has no stored flow state.

Thus, the comparison with the predetermined patterns can be omitted when a shared flow state exists, and thus the processing of traffic is faster. Furthermore, no load is generated on the IE in this case.

In a third implementation form of the system according to the first aspect as such or according to any previous implementation form of the first aspect, the FE is configured to immediately block packets of a data flow, when the IE sets or updates a flow state of said data flow to "BLOCK".

Thus, the system can react very fast and efficiently to detected threats, making the network in which the system resides more secure.

In a fourth implementation form of the system according to the first aspect as such or according to any previous implementation form of the first aspect, the FE is configured to set or update a flow state of a data flow to "SUSPECT", when the data flow matches a predetermined pattern of suspected traffic, and is configured to replicate said data flow to the IE for classification.

Accordingly, only suspected data flows are sent to the IE for classification. As a result, the load on the intrusion detection and prevention is significantly reduced.

In a fifth implementation form of the system according to the first aspect as such or according to any previous implementation form of the first aspect, the FE is configured to alter a flow state of an arbitrary received data flow to "SUSPECT".

Accordingly, the data flows can be re-inspected. This significantly improves overcoming specific APTs, which randomize their attack vectors.

In a sixth implementation form of the system according to the fourth or fifth implementation form of the first aspect, the FE is configured to stall the forwarding of packets of a data flow that matches a predetermined pattern of suspected traffic, until the classification by the IE is complete, and then either block or forward normally the packets, depending on the classification result.

This option increases the security of the protected zone or service of the network.

In a seventh implementation form of the system according to the fourth or fifth implementation form of the first aspect, the FE is configured to replicate to the IE and normally forward packets of a data flow that matches a predetermined pattern of suspected traffic, until the classification by the IE is complete, and then either block or continue forwarding normally the packets, depending on the classification result.

This option enhances the efficiency of processing traffic, i.e. by maintaining the flow of the traffic without interruption.

In an eighth implementation form of the system according to the first aspect as such or according to any previous implementation form of the first aspect, the FE is configured to leave a flow state of a data flow at "SUSPECT" for a predetermined period of time, regardless of the classification result.

This allows the IE to particularly detect "low & slow" attacks, i.e. it increases the security of the system to APTs.

In a ninth implementation form of the system according to the first aspect as such or according to any previous implementation form of the first aspect, the IE is configured to alter a flow state of a replicated data flow to "END", and the FE is configured to stop replicating said data flow to the IE, when the IE alters the flow state to "END".

Thus, the replication of suspected data flows can be stopped immediately, which avoids unnecessary waste of resources.

In a tenth implementation form of the system according to the first aspect as such or according to any previous implementation form of the first aspect, the FE is configured to bypass the IE for packets of a data flow, which has been previously classified as allowed.

Accordingly, the load on intrusion detection and prevention can be significantly reduced.

In an eleventh implementation form of the system according to the first aspect as such or according to any previous implementation form of the first aspect, the at least one data storage or memory is configured to store metadata of data flows, and to share and update the metadata across the system, and the FE is configured to block, forward, or replicate a received data flow based on a flow state and metadata of the data flow.

The intrusion detection and prevention in the system are made even more accurate and efficient, when the additional metadata is shared.

In a twelfth implementation form of the system according to the first aspect as such or according to any previous implementation form of the first aspect, the FE is connected to an SDN controller, and the SDN controller is configured to provide the FE with the predetermined patterns.

This implementation form allows an easy and flexible configuration of the at least one FE. Thus, the system can be customized, and is also well scalable.

A second aspect of the present disclosure provides a method for detecting and preventing intrusion of malicious data flows in a software defined network, SDN, comprising storing flow states of data flows, and sharing and updating the flow states across the SDN, blocking, forwarding, or replicating a received data flow based on a flow state of the data flow and/or a comparison of the data flow with predetermined patterns, classifying, whether a replicated data flow is malicious or allowed, and altering a flow state of the data flow according to a classification result.

In a first implementation form of the method according to the second aspect, the FE is configured to forward packets of a received data flow, if a flow state of the data flow is "ALLOW" and/or if the data flow matches a predetermined pattern of allowed traffic, block packets of a received data flow, if a flow state of the data flow is "BLOCK" and/or if the data flow matches a predetermined pattern of malicious traffic, and replicate packets of a received data flow, if a flow state of the data flow is "SUSPECT" and/or if the data flow matches a predetermined pattern of suspected traffic.

In a second implementation form of the method according to the second aspect as such or according to the first implementation form of the second aspect, the FE is configured to determine, whether a received data flow already has a flow state stored in the at least one data storage or memory, and to block, forward, or replicate the data flow based on the flow state of the data flow, if the received data flow has a stored flow state, or a comparison of the data flow with the predetermined patterns, if the received data flow has no stored flow state.

In a third implementation form of the method according to the second aspect as such or according to any previous implementation form of the second aspect, the FE is configured to immediately block packets of a data flow, when the IE sets or updates a flow state of said data flow to "BLOCK".

In a fourth implementation form of the method according to the second aspect as such or according to any previous implementation form of the second aspect, the FE is configured to set or update a flow state of a data flow to "SUSPECT", when the data flow matches a predetermined pattern of suspected traffic, and is configured to replicate said data flow to the IE for classification.

In a fifth implementation form of the method according to the second aspect as such or according to any previous implementation form of the second aspect, the FE is configured to alter a flow state of an arbitrary received data flow to "SUSPECT".

In a sixth implementation form of the method according to the fourth or fifth implementation form of the second aspect, the FE is configured to stall the forwarding of packets of a data flow that matches a predetermined pattern of suspected traffic, until the classification by the IE is complete, and then either block or forward normally the packets, depending on the classification result.

In a seventh implementation form of the method according to the fourth or fifth implementation form of the second aspect, the FE is configured to replicate to the IE and normally forward packets of a data flow that matches a predetermined pattern of suspected traffic, until the classification by the IE is complete, and then either block or continue forwarding normally the packets, depending on the classification result.

In an eighth implementation form of the method according to the second aspect as such or according to any previous implementation form of the second aspect, the FE is configured to leave a flow state of a data flow at "SUSPECT" for a predetermined period of time, regardless of the classification result.

In a ninth implementation form of the method according to the second aspect as such or according to any previous implementation form of the second aspect, the IE is configured to alter a flow state of a replicated data flow to "END", and the FE is configured to stop replicating said data flow to the IE, when the IE alters the flow state to "END".

In a tenth implementation form of the method according to the second aspect as such or according to any previous implementation form of the second aspect, the FE is configured to bypass the IE for packets of a data flow, which has been previously classified as allowed.

In an eleventh implementation form of the method according to the second aspect as such or according to any previous implementation form of the second aspect, the at least one data storage or memory is configured to store metadata of data flows, and to share and update the metadata across the system, and the FE is configured to block, forward, or replicate a received data flow based on a flow state and metadata of the data flow.

In a twelfth implementation form of the method according to the second aspect as such or according to any previous implementation form of the second aspect, the FE is connected to an SDN controller, and the SDN controller is configured to provide the FE with the predetermined patterns.

The method of the second aspect as such and its implementation forms achieve the same advantages as the system of the first aspect as such and its implementation forms, respectively.

A third aspect of the present disclosure provides a computer program product for implementing, when carried out on a computing device, a method for detecting and preventing network intrusion of malicious data flows in a software defined network, SDN, according to the second aspect as such or according to any implementation form of the second aspect.

With the computer program product of the third aspect, all advantages of the method of the second aspect and its implementation forms are achieved.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
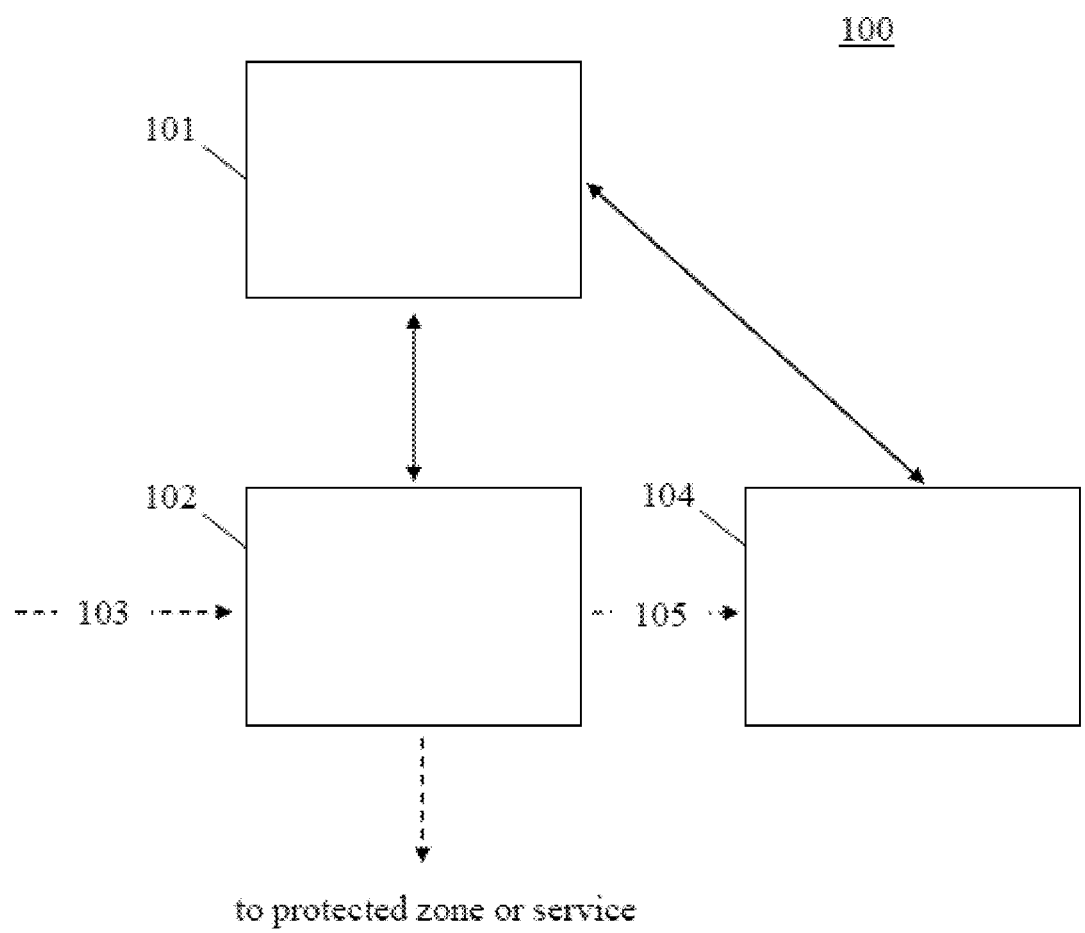
FIG. 1 shows a system according to an embodiment of the present disclosure.

FIG. 1 shows a system 100 according to an embodiment of the present disclosure. The system 100 is able to detect and prevent the intrusion of malicious data flows in a SDN. In particular, the system 100 allows preventing the intrusion of malicious data flows into a protected zone or service of the network.

The system 100 include at least one data storage or memory 101, in order to store flow states of data flows, and to share and update the flow states across the system 100. The data storage or memory 101 is preferably a high-speed low-latency distributed memory (such as a Distributed Memory Data Base or a similar technology), to which the flow states may be written, and from which the flow states can be read, preferably by entity of the system, in order to share them across the system 100. Accordingly, shared flow states are provided across the system 100, enabling the system 100 fast reaction times to threats. Preferably, the data storage or memory 101 is also configured to store metadata of data flows, and to share and update the metadata across the system 100 in the same manner as the flow states.

The system 100 further includes at least one shared-state FE 102, which is configured to block, forward, or replicate a received data flow 103 based on a flow state of the data flow and/or based on a comparison of the data flow with predetermined patterns. The predetermined patterns may preferably be stored in the FE 102, or also in the data storage or memory 101. Preferably, the FE 102 can be connected to an SDN controller, which can provide the FE 102 with the predetermined patterns.

The FE 102 can obtain a flow state of the received data flow 103 from the data storage or memory 101. For instance, the FE 102 can query the data storage or memory 101 for a corresponding flow state. Preferably, however, the data storage or memory 101 actively distributes the most recent flow state of a data flow to all FEs 102. The at least one FE 102 may specifically be configured to block, forward, or replicate a received data flow 103 based on a flow state and additional metadata of the data flow, in case that such metadata is also shared across the system 100.

The system 100 further includes at least one IE 104, which is configured to receive a replicated data flow 105 from the at least one FE 102, and to classify, whether the data flow is malicious or allowed. Further, the IE 104 is configured to alter the flow state of the data flow according to a classification result. That is, the IE 104 can access the data storage or memory 101, in order to update the flow state of a classified data flow. The updated flow state can then be shared across the system 100, in order to ensure that the most recent flow states are available at each one of the at least one FE 102. Thus, the system 100 can immediately react to detected threats.

Figure 2:
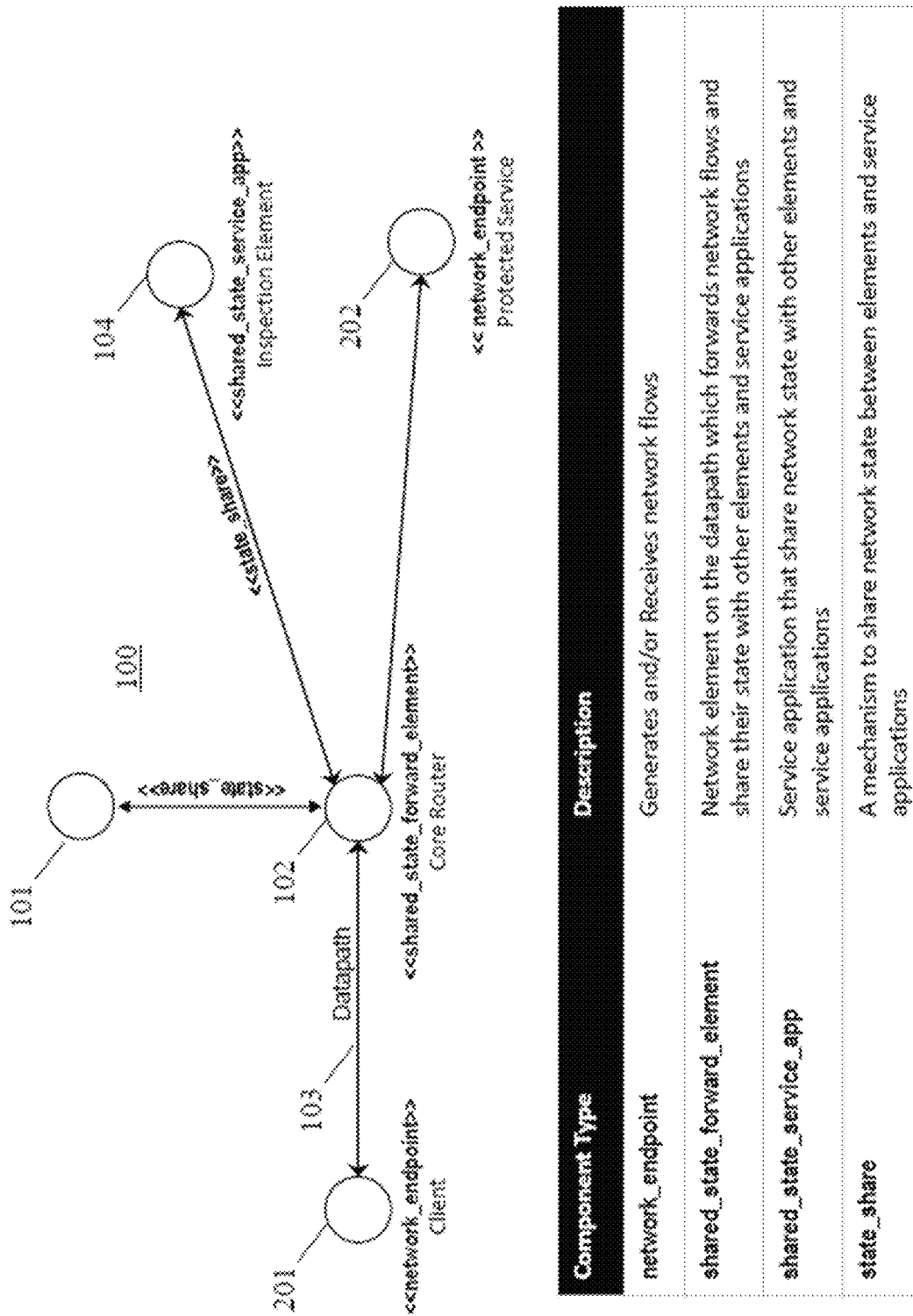
FIG. 2 shows a system according to an embodiment of the present disclosure.

FIG. 2 shows an embodiment according to the present disclosure, which builds on the embodiment presented in FIG. 1. Like in FIG. 1, the system 100 includes the at least one FE 102, the at least one data storage or memory 101, and the at least one IE 104. Here, the FE 102 is, for instance, a core router. Further, FIG. 2 shows two network endpoints, namely a client 201 and a protected service 202 (or protected zone) of a network.

As indicated in the table of FIG. 2, the network endpoint 201 may generate and/or receive a network data flow, and may forward it as data flow 103 on a regular data path to the at least one FE 102. The at least one FE 102 is accordingly provided on the data path from the client 201 to the protected service 202. As indicated in FIG. 2, the FE may be implemented with a "shared_state_forward_element" function, i.e. it can forward data flows and can share their flow states with other network elements and/or service applications. The at least one IE 104 may be implemented with a "shared_state_service_app" and a "state_share" function, i.e. it can function as a service application that shares network states and flow states with other network elements and service applications. The at least one data storage or memory 101 may also implement a "state_share" function, i.e. it can share network states and flow states with other network elements and service applications.

In FIG. 2, when network packets arrive at the client 201 (which is e.g. a Gateway router, a Firewall or the like), these network packets may be forwarded as a data flow 103 to the at least one FE 102. A network packet of the data flow 103 can be associated with one of the following groups. "New and Allowed", i.e. an arriving network packet is a first packet of a new data flow 103 that matches a predetermined pattern of allowed traffic. "New and Malicious", i.e. an arriving network packet is a first packet of a new data flow 103 that matches a predetermined pattern of blocked traffic. "New and Suspect", i.e. an arriving network packet is a first packet of a new data flow 103 that does not match a predetermined pattern, or matches a predetermined pattern of suspected traffic. "Interim and Suspect", i.e. an arriving network packet is an advanced packet of a suspect data flow 103. "Interim and Allowed", i.e. an arriving network packet is an advanced packets of a data flow 103 that is allowed. "Interim and Malicious", i.e. an arriving network packet is an advanced packet of a data flow 103 that is malicious. The at least one FE 102 can determine, to which group arriving network packets belong, for instance, by comparison of the data flow 103 with the predetermined patterns.

However, the FE 102 is also provided with shared flow states of data flows from the at least one data storage or memory 101, or even directly from the IE 104, via the "share state" function. That is, the FE 102 can also determine the kind of the arriving network packets based on the shared flow states. Preferably, the FE 102 is configured to determine, whether a received data flow 103 already has a flow state stored in the at least one data storage or memory 101, and to block, forward, or replicate the data flow based on only the flow state of the data flow, if the received data flow has a stored flow state. Alternatively, the FE 102 is preferably configured to block, forward, or replicate the data flow 103 based only on a comparison of the data flow with the predetermined patterns, if the received data flow 103 has no stored flow state.

Preferably, the FE 102 is configured to forward (to the protected service 202) the network packets of a received data flow 103, if either a shared flow state of the data flow is "ALLOW" and/or if the data flow matches a predetermined pattern of allowed traffic. Alternatively, the FE 102 is configured to block packets of a data flow, if a shared flow state of the data flow is either "BLOCK" and/or if the data flow matches a predetermined pattern of malicious traffic. Alternatively, the FE 102 is configured to replicate packets of a data flow (to the IE 104), if either a flow state of the data flow is "SUSPECT" and/or if the data flow matches a predetermined pattern of suspected traffic or matches no predetermined pattern. Accordingly, the FE 102 is configured to steer packets of a suspect data flow towards an IE 104, and to bypass the IE 104 for packets belonging to an allowed data flow 103, and to block completely packets of a malicious data flow 103. Thereby, the load on the IE 104 can be kept at a minimum.

Only the replicated packets of a suspected data flow 103 are forward to the IE 104 for further inspection. In particular, the inspection of suspect traffic may be done by at least one IE 104 implementing a "shared_state_service_app" function. The IE 104 may further employ a DCT mechanism to alter the flow state of a data flow (e.g. from "ALLOW" to "BLOCK") in the at least one data storage or memory 101. The altered flow state is then shared. The processing of the packets of a data flow is then carried out by the FE 102, which is configured to react to a modification of flow states of data flows in the data storage or memory 101 (e.g. to "BLOCK").

Figure 3:
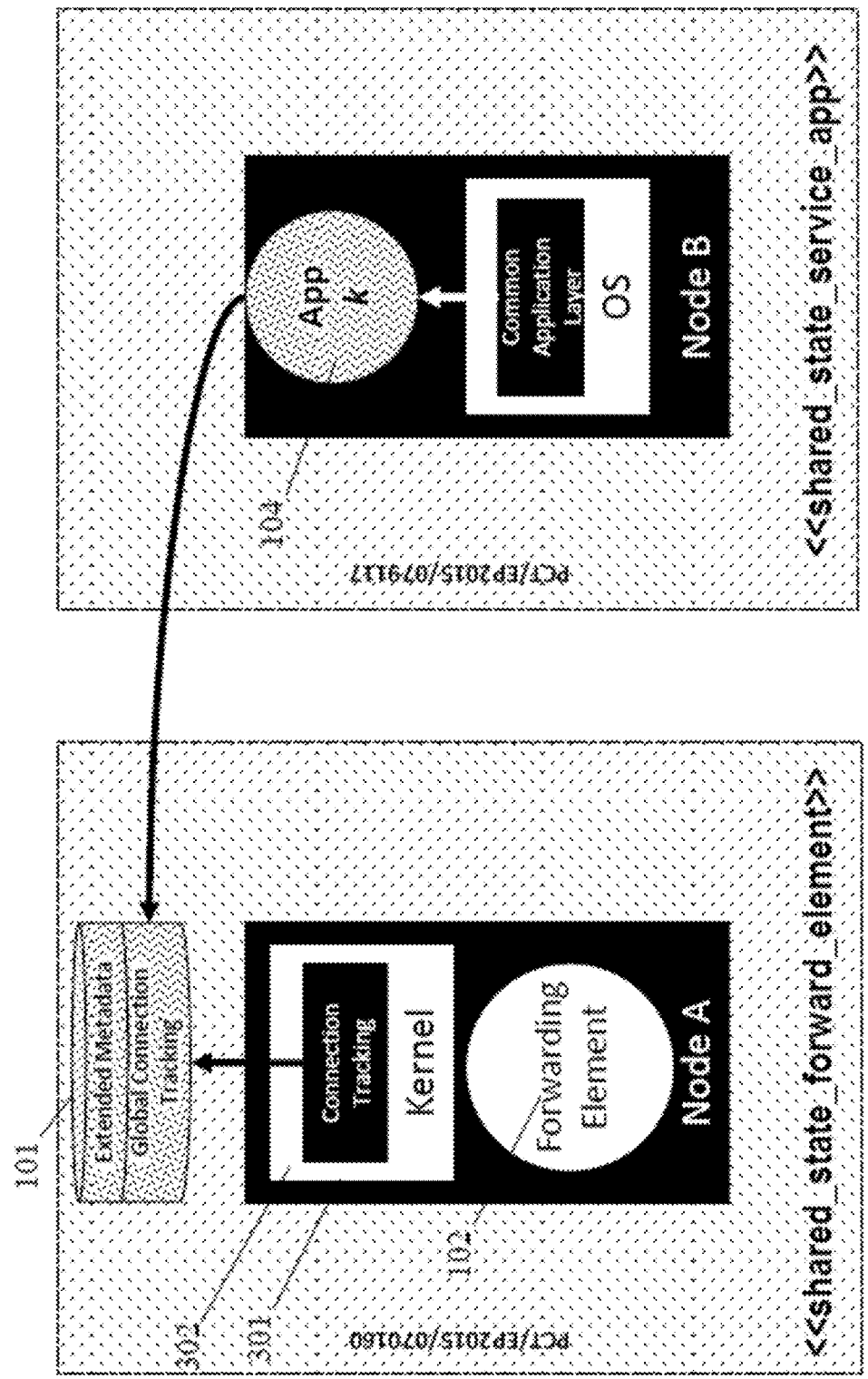
FIG. 3 shows components of a system according to an embodiment of the present disclosure.

FIG. 3 shows possible components for an embodiment using a DCT mechanism. The FE 102 may be included in a first network node (Node A). Node A may also include a Kernel 301 with a connection tracking module 302, which is configured to perform connection tracking on at least one network packet belonging to a received data flow. The at least one data storage and memory 101 may also be provided in Node A, and may be configured to store the connection tracking data obtained by the at least one connection tracking module 302. Particularly, a flow state may be part of the connection tracking data. Preferably, also metadata may be included in the connection tracking data. The stored connection tracking data is shared across the system 100. The "shared_state_service_app" function of the IE 104 may be included in another network node (Node B). The IE 104 is configured to update the connection tracking data, particularly the flow state, stored in the data storage or memory 101, based on a result of classification of a suspected data flow. Patent applications PCT/EP2015/070160 and PCT/EP2015/079117 provide more details about the DCT mechanism. In particular, DCT is explained in PCT/EP2015/070160, and can here be used to share flow states and metadata between FEs 102 and IEs 104. Further, a "Common Application Layer using DCT" is explained in PCT/EP2015/079117 and can here be used to implement steering of suspected packet flows to the IE 104.

Figure 4:
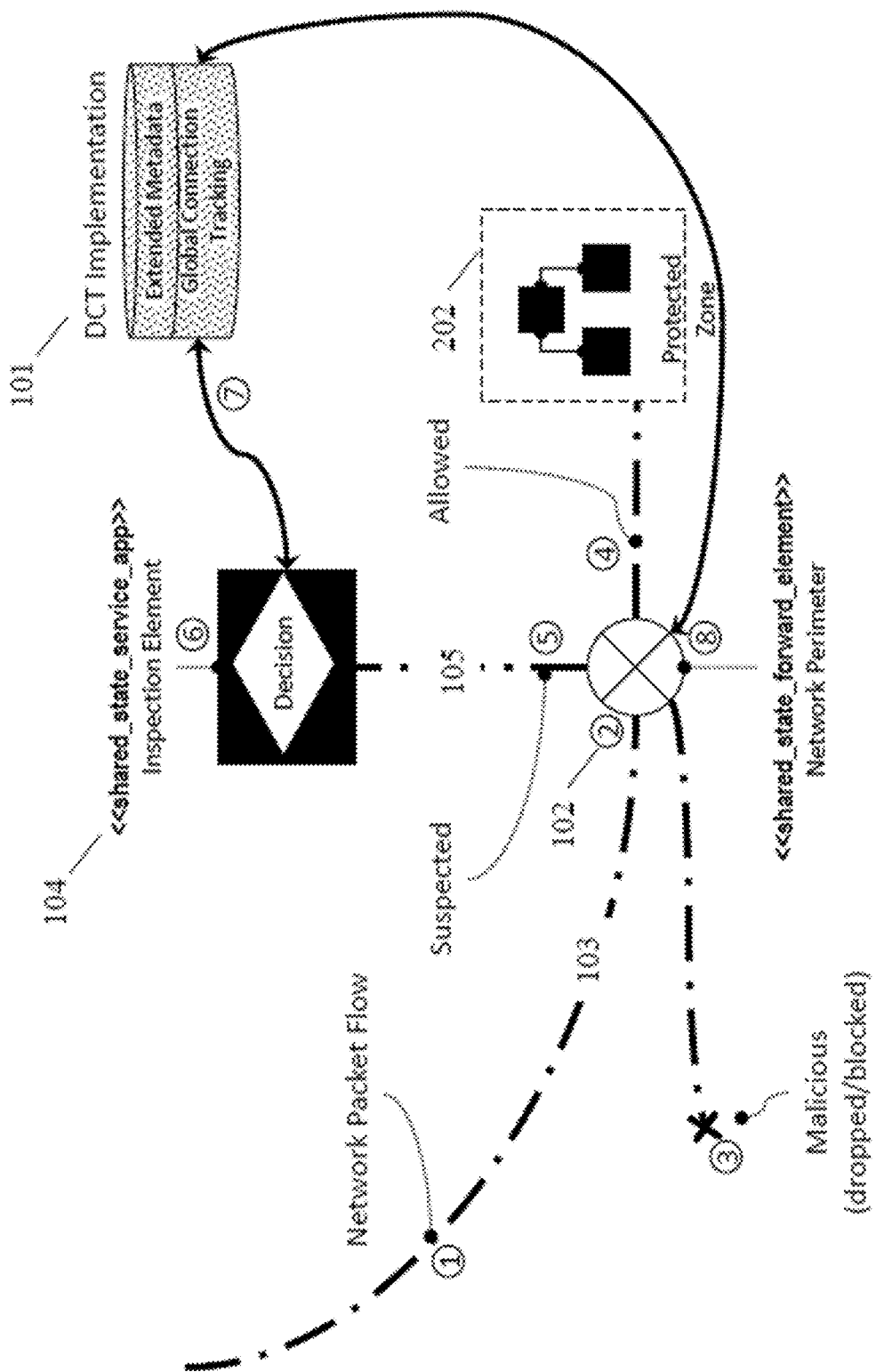
FIG. 4 shows a system according to an embodiment of the present disclosure.

FIG. 4 shows an embodiment of the present disclosure that builds on the previous embodiments of the FIGS. 1 and 2, and is also suitable for DCT implementation. An arriving data flow 103 of network packets (1), may contain new and interim packets as described above. The at least one FE 102 either (2) blocks, allows (forwards normally to a protected zone 202), or allows and replicates a data flow towards the IE 104, based on a shared flow state and/or predetermined patterns. Data flows that are matched (3) and as a consequence blocked, are dropped by the FE 102. Data flows that are matched and as a consequence allowed, are forwarded normally (4) into the protected zone 202 or service. Data flows that are suspect are as a consequence replicated (5) towards the IE 104 for classification. In this case, the FE 102 may be configured to stall the forwarding of the packets of the suspect data flow, until a classification by the IE 104 is complete. Alternatively, the FE 102 may be configured to normally forward the packets of the suspect data flow into the protected zone 21303, until the classification by the IE 104 is complete.

The IE 104 receives (6) the replicated data flow 105 for further classification. Once the IE 104 decides, whether the data flow is malicious or not, it updates the flow state of the data flow in the data storage and/or memory 101, specifically by using the DCT mechanism (as implemented by PCT/EP2015/070160 and PCT/EP2015/079117, see also FIG. 3). In addition, the IE 104 preferably removes the replication action of the data flow. That is, the IE 104 is preferably configured to alter a flow state of a replicated data flow 105 to "END", and then preferably the FE 102 is configured to stop replicating said data flow to the IE 104.

Once the flow state of the data flow is changed, the at least one FE 102 is updated accordingly, and for a data flows that is set to "BLOCK", blocking is enforced. Preferably, the FE 102 is configured to immediately (i.e. already starting with the next data packet of the data flow) block packets of a data flow, when the IE 104 sets or updates a flow state of said data flow to "BLOCK".

Figure 5:
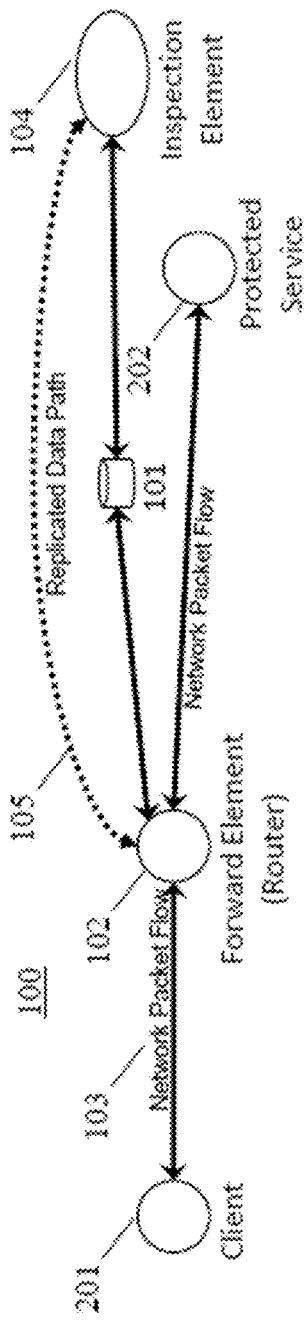
FIG. 5 shows a system according to an embodiment of the present disclosure.

FIG. 5 shows an embodiment of the present disclosure that builds on the embodiments of the FIGS. 1 and 2 and shows some important points. As in the FIGS. 1 and 2, the system 100 includes the at least one FE 102, the at least one data storage or memory 101, and the at least one IE 104. As in FIG. 2, the system 100 may include a client 201 and a protected service 202 or zone.

Traffic (i.e. data flows) from the client 201 towards the protected service 202 arrives at the FE 102. The FE 102 may create a new data flow named "F1" in the table of FIG. 5, e.g. with a flow status "NEW" in the data storage or memory 101 (for instance implemented by DCT). The IE 104 may actively suspect the data flow "F1" to be malicious, and can this update the status of "F1" in the data storage or memory 101 to "SUSPECT", with a "REPLICATE" action. The FE 102 is accordingly updated via the data storage or memory 101 with the flow status "SUSPECT" for the data flow "F1", and thus executes the replicate action, in order to reproduce a replicated data flow named "F1R", i.e. a replication of the packet flow between the client 201 and the protected service 202, which is sent towards the at least one IE 104. Meanwhile, the at least one FE 102 may continue forwarding the data flow "F1" normally towards the protected service 202.

The IE 104 receives the replicated data flow 105 and, for example, after several packets it can classify the data flow. The IE 104 then updates the flow state of "F1" in the data storage or memory 101, for instance, to "MALICIOUS" with an action "BLOCK". The IE 104 can then also update the flow state of "F1R" in the data storage or memory 101 to "END", which stops the replication. The FE 102 is accordingly updated via the data storage or memory 101 with a flow state "BLOCK" for the data flow "F1", and immediately blocks it, and to a flow state "REMOVE" for the data flow "F1R", and immediately stops the replication of this data flow.

In the scenario described in FIG. 5, malicious data flows are blocked from entering the organization, i.e. the protected service 202, as soon as they are classified as such. The data flow classification is done "just in time" and "just as long as needed", without placing any additional elements on the network data path.

Due to the shared state nature of the flow states, for instance shared via DCT mechanism, the moment a flow states is updated by the IE 104, e.g. that a certain data flow needs to be blocked, the blocking is immediately enforced by all FEs 102 of system 100 i.e. across the network (switches, routers, load balancers, etc.), in which the system 100 resides. Since the IE 104 is located outside of the critical data path to the protected zone 202, handling is simplified and is highly available and easily scalable.

The embodiments presented above in the FIGS. 1-5 can be provided with additional features. For instance, a handling of allowed and blocked data flows can be optimized by bypassing the IE 104 for data flows that are already classified. Specifically, the FE 102 may be configured to bypass the IE 104 for packets of a data flow, which has been previously classified as allowed.

Further, the FE 102 can be connected to an SDN Controller, which may be used to install OpenFlow rules (or OpFlex, or the likes of which) as the predetermined patterns to match network data flows, in order to implement the "ALLOW", "BLOCK" and "REPLICATE" actions. In other words the SDN controller is configured to provide the FE 102 with the predetermined patterns.

The FE 102 may also be configured to steer a data flow of suspected traffic towards the IE 104, placing it temporary in-line, until such time as it is done classifying the data flow, and then the data flow is either blocked, or steered directly to its destination, bypassing the IE 104. Alternatively, the FE 102 may initiate replication of suspected data flows and steer the replication towards the IE 104, while the traffic is also being forwarded normally to its destination, until such time as it is done classifying the traffic, and then the network packet flow is either blocked or remains allowed, and the replication towards the IE 104 is removed. That is, the FE 102 is configured to stall the forwarding of packets of a data flow that matches a predetermined pattern of suspected traffic, or to replicate to the IE 104 and normally forward packets of a data flow that matches a predetermined pattern of suspected traffic, until the classification by the IE 104 is complete.

Data flows that are suspected as APTs can be handled by letting them remain as "SUSPECT" for long periods of time, allowing the IE 104 to detect "low & slow" attacks. To this end, the FE 102 may be configured to leave a flow state of a data flow at "SUSPECT" for a predetermined period of time, regardless of the classification result.

It is also possible to randomly (or periodically) kick data flows that are allowed into "SUSPECT" flow state, e.g. for re-inspection, and in order to overcome some APTs that randomize their attack vectors. To this end, the at least one FE 102 may be configured to alter a flow state of an arbitrary received data flow to "SUSPECT".

Figure 6:
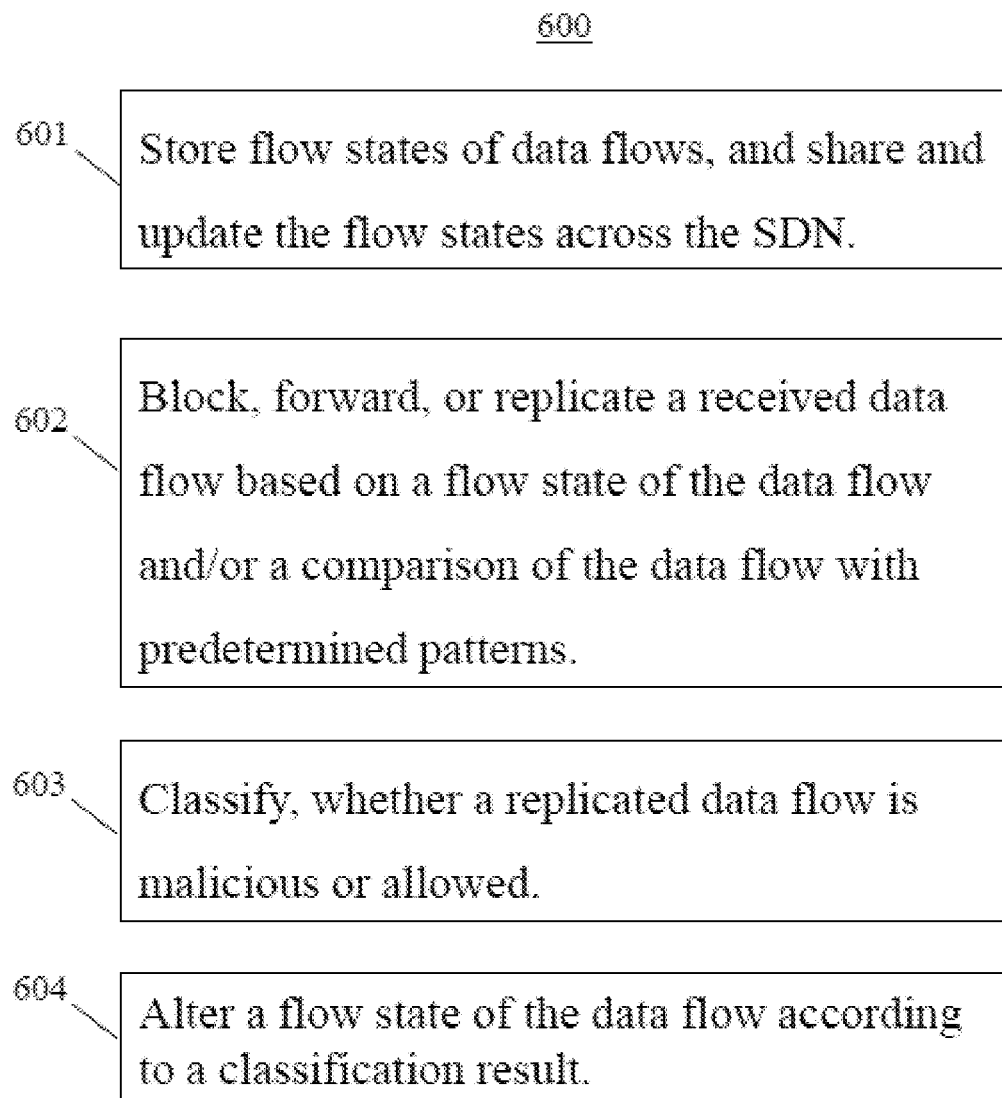
FIG. 6 shows a method according to an embodiment of the present disclosure.
Figure 7:
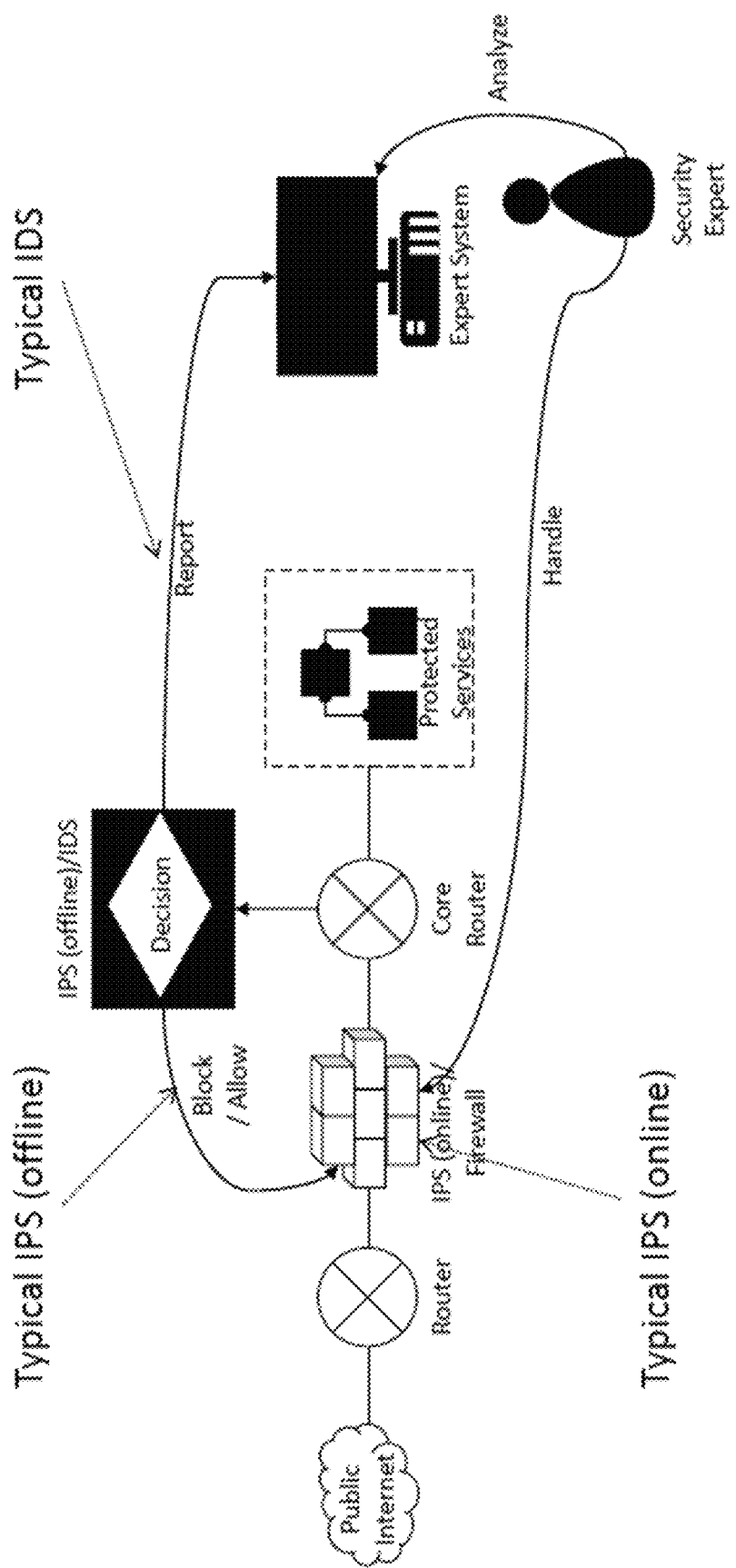
FIG. 7 shows an IPS/IDS system according to the state of the art.

FIG. 6 shows a method 600 according to an embodiment of the present disclosure. The method 600 can be carried out, in order to detect and prevent intrusion of malicious data flows in a SDN. In a first step 601, flow states of data flows are stored, and are shared and updated across the SDN. In a second step 602, a received data flow is blocked, forwarded, or replicated based on a flow state of the data flow and/or a comparison of the data flow with predetermined patterns. Then, in a third step 603, it is classified, whether a replicated data flow is malicious or allowed. Finally, in a fourth step 604, a flow state of the data flow is altered according to a classification result. The method 600 can of course be extended with additional and specific method steps according to the feature description of the system 100 above.

In summary, according to embodiments of the present disclosure, the IPS is removed from a data path without compromising its ability to detect, inspect and block malicious traffic. Further, the IPS is removed as a SPOF from the network, and load on the IPS is reduced to only include pertinent suspect data flows, while all data flows that are already classified are not forwarded at all to an IPS. Blocking of malicious data flows is instantaneous across the system and thus the network the system resides in. Also, no cross-vendor integration is required to implement the IPS blocking and data flow replication mechanism.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. The mere fact that certain measures are recited in the mutual different dependent claims does not indicate that a combination of these measures cannot be used in an advantageous implementation.

What is claimed is:

1. A system for detecting and preventing the intrusion of malicious data flows in a software defined network (SDN), comprising at least one processor; and at least one non-transitory computer-readable storage medium including computer-executable instructions executed by the at least one processor to perform operations comprising:
   storing, on the at least one non-transitory computer-readable storage medium, flow states of data flows; and
   sharing and updating, from the at least one non-transitory computer-readable storage medium, the flow states across the system;
   determining, whether a received data flow already has a flow state stored in the at least one non-transitory computer-readable storage medium;
   performing, by at least one shared state forwarding processor of the at least one processor, one of: blocking, forwarding, or replicating the received data flow based on:
      a flow state of the received data flow, when the received data flow has a stored flow state; and
      a comparison of the received data flow with a predetermined pattern of allowed traffic, a predetermined pattern of malicious traffic, or a predetermined pattern of suspected traffic, when the received data flow has no stored flow state;
   receiving, by at least one inspection processor of the at least one processor, a replicated data flow that is "SUSPECT" or matches the predetermined pattern of suspected traffic; and
   classifying whether the received replicated data flow is malicious or allowed;
   altering, by the at least one inspection processor, the flow state of the received replicated data flow according to a classification result indicating whether the received replicated data flow is malicious or allowed,
   wherein performing one of: blocking, forwarding, or replicating the received data flow comprises:
      in response to the received data flow having a stored flow state, wherein the stored flow state is updated based on each classification by the at least one inspection processor of the at least one processor,
      forwarding, by the at least one shared state forwarding processor of the at least one processor, packets of the received data flow to a protected zone or service of the SDN based on the flow state of the received data flow being "ALLOW";
      blocking, by the at least one shared state forwarding processor of the at least one processor, packets of the received data flow from the protected zone or service of the SDN based on the flow state of the received data flow being "BLOCK";
      replicating, by the at least one shared state forwarding processor of the at least one processor, packets of the received data flow based on the flow state of the received data flow being "SUSPECT"; and
   in response to the received data flow not having a stored flow state,
      forwarding, by the at least one shared state forwarding processor of the at least one processor, packets of the received data flow to the protected zone or service of the SDN based on the received data flow matching the predetermined pattern of allowed traffic;

blocking, by the at least one shared state forwarding processor of the at least one processor, packets of the received data flow from the protected zone or service of the SDN based on the received data flow matching the predetermined pattern of malicious traffic; and replicating, by the at least one shared state forwarding processor of the at least one processor, packets of the received data flow based on the received data flow matching the predetermined pattern of suspected traffic, and wherein the replicating the packets of the received data flow based on the flow state of the received data flow is "SUSPECT" or the received data flow matches the predetermined pattern of suspected traffic comprises at least one of:

forwarding the packets of the received data flow to the at least one inspection processor for classifying; or stalling the packets of the received data flow until the at least one inspection processor completes classifying, and then blocking or forwarding the packets of the received data flow based on the classification result.

2. The system according to claim 1, wherein the operations performed, by the at least one shared state forwarding processor, further comprise immediately blocking packets of a data flow, when the at least one inspection processor performs the operation of setting or updating a flow state of the data flow to "BLOCK".

3. The system according to claim 1, wherein the operations performed, by at least one shared state forwarding processor, further comprise:

setting or updating a flow state of a data flow to "SUSPECT", when the received data flow matches the predetermined pattern of suspected traffic;

replicating the received data flow; and sending the replicated data flow to the at least one inspection processor for classification.

4. The system according to claim 3, wherein the operations performed, by at least one shared state forwarding processor, further comprise:

stalling the forwarding of packets of a data flow that matches a predetermined pattern of suspected traffic, until performing of classification, by the at least one inspection processor, is complete; and then either blocking or continuing to forward the packets, based on the classification result.

5. The system according to claim 3, wherein the operations performed, by at least one shared state forwarding processor, further comprise:

replicating a data flow that matches the predetermined pattern of suspected traffic;

sending the replicated data flow to the at least one inspection processor;

continuing to forward packets of the data flow that matches the predetermined pattern of suspected traffic, until the operation of classifying whether the received data flow is malicious or allowed is complete; and then either blocking or continuing to forward the packets, based on the classification result.

6. The system according to claim 1, wherein the operations performed, by at least one shared state forwarding processor, further comprise altering a flow state of a randomly selected received data flow to "SUSPECT".

7. The system according to claim 1, wherein the operations performed, by the at least one shared state forwarding processor, further comprise maintaining a flow state of a data flow as "SUSPECT" for a predetermined period of time, regardless of the classification result.

8. The system according to claim 1, wherein the operations further comprise:

altering, by the at least one inspection processor, a flow state of a replicated data flow to "END", and stopping, by the at least one shared state forwarding processor, the replication and sending to the at least one inspection processor of the received data flow, when the at least one inspection processor alters the flow state to "END".

9. The system according to claim 1, wherein the operations performed, by at least one shared state forwarding processor, further comprise:

bypassing the at least one inspection processor for packets of a data flow, which has been previously classified as allowed.

10. The system according to claim 1, wherein the operations further comprise:

storing metadata of data flows, on the at least one non-transitory computer-readable storage medium; and sharing and updating the metadata across the system, from the at least one non-transitory computer-readable storage medium, and wherein performing one of: blocking, forwarding, or replicating the received data flow is further based on metadata of the received data flow.

11. The system according to claim 1, wherein the at least one shared state forwarding processor is connected to a SDN controller, and the operations further comprise:

providing, by the SDN controller and to the at least one shared state forwarding processor, the predetermined patterns.

12. A method for detecting and preventing intrusion of malicious data flows in a software defined network (SDN), comprising:

storing flow states of data flows; and sharing and updating the flow states across the SDN;

determining, whether a received data flow already has a flow state stored in the at least one non-transitory computer-readable storage medium;

performing one of: blocking, forwarding, or replicating a received data flow based on:

a flow state of the data flow, when the received data flow has a stored flow state; and a comparison of the data flow with a predetermined pattern of allowed traffic, a predetermined pattern of malicious traffic, or a predetermined pattern of suspected traffic, when the received data flow has no stored flow state;

classifying whether a replicated data flow that is "SUSPECT" or matches the predetermined pattern of suspected traffic is malicious or allowed; and altering the flow state of the data flow according to a classification result indicating whether the replicated data flow is malicious or allowed, wherein performing one of: blocking, forwarding, or replicating the received data flow comprises:

in response to the received data flow having a stored flow state, wherein the stored flow state is updated based on each classification by at least one inspection processor of at least one processor, forwarding, by at least one shared state forwarding processor of the at least one processor, packets of the received data flow to a protected zone or service of the SDN based on the flow state of the received data flow being "ALLOW";

blocking, by the at least one shared state forwarding processor of the at least one processor, packets of the received data flow from the protected zone or service of the SDN based on the flow state of the received data flow being "BLOCK";

replicating, by the at least one shared state forwarding processor of the at least one processor, packets of the received data flow based on the flow state of the received data flow being "SUSPECT"; and in response to the received data flow not having a stored flow state, forwarding, by the at least one shared state forwarding processor of the at least one processor, packets of the received data flow to the protected zone or service of the SDN based on the received data flow matching the predetermined pattern of allowed traffic;

blocking, by the at least one shared state forwarding processor of the at least one processor, packets of the received data flow from the protected zone or service of the SDN based on the received data flow matching the predetermined pattern of malicious traffic; and replicating, by the at least one shared state forwarding processor of the at least one processor, packets of the received data flow based on the received data flow matching the predetermined pattern of suspected traffic, and wherein the replicating the packets of the received data flow based on the flow state of the received data flow is "SUSPECT" or the received data flow matches the predetermined pattern of suspected traffic comprises at least one of:

forwarding the packets of the received data flow for classifying; or stalling the packets of the received data flow until completing classifying, and then blocking or forwarding the packets of the received data flow based on the classification result.

13. A non-transitory computer-readable storage medium including computer-executable instructions executable by at least one processor to perform operations, for detecting and preventing intrusion of malicious data flows in a software defined network (SDN), comprising:

storing flow states of data flows; and sharing and updating the flow states across the SDN;

performing one of: blocking, forwarding, or replicating a received data flow, based on:

a flow state of the data flow, when the received data flow has a stored flow state; and a comparison of the data flow with a predetermined pattern of allowed traffic, a predetermined pattern of malicious traffic, or a predetermined pattern of suspected traffic, when the received data flow has no stored flow state;

classifying whether a replicated data flow that is "SUSPECT" or matches the predetermined pattern of suspected traffic is malicious or allowed; and altering the flow state of the data flow according to a classification result indicating whether the replicated data flow is malicious or allowed, wherein performing one of: blocking, forwarding, or replicating the received data flow comprises:

in response to the received data flow having a stored flow state, wherein the stored flow state is updated based on each classification by at least one inspection processor of the at least one processor, forwarding, by at least one shared state forwarding processor of the at least one processor, packets of the received data flow to a protected zone or service of the SDN based on the flow state of the received data flow being "ALLOW";

blocking, by the at least one shared state forwarding processor of the at least one processor, packets of the received data flow from the protected zone or service of the SDN based on the flow state of the received data flow being "BLOCK";

replicating, by the at least one shared state forwarding processor of the at least one processor, packets of the received data flow based on the flow state of the received data flow being "SUSPECT"; and in response to the received data flow not having a stored flow state, forwarding, by the at least one shared state forwarding processor of the at least one processor, packets of the received data flow to the protected zone or service of the SDN based on the received data flow matching the predetermined pattern of allowed traffic;

blocking, by the at least one shared state forwarding processor of the at least one processor, packets of the received data flow from the protected zone or service of the SDN based on the received data flow matching the predetermined pattern of malicious traffic; and replicating, by the at least one shared state forwarding processor of the at least one processor, packets of the received data flow based on the received data flow matching the predetermined pattern of suspected traffic, and wherein the replicating the packets of the received data flow based on the flow state of the received data flow is "SUSPECT" or the received data flow matches the predetermined pattern of suspected traffic comprises at least one of:

forwarding the packets of the received data flow for classifying; or stalling the packets of the received data flow until completing classifying, and then blocking or forwarding the packets of the received data flow based on the classification result.

* * * * *